United States Patent [19]

Lautzenhiser

[11] 4,255,969

[45] Mar. 17, 1981

[54] RING LASER GRAVITY GRADIOMETER

[75] Inventor: Theodore V. Lautzenhiser, Tulsa, Okla.

[73] Assignee: Standard Oil Company, Chicago, Ill.

[21] Appl. No.: 111,420

[22] Filed: Jan. 11, 1980

Related U.S. Application Data

[63] Continuation of Ser. No. 39,410, May 15, 1979, abandoned, which is a continuation of Ser. No. 910,972, May 30, 1978, abandoned.

[51] Int. Cl.³ .............................................. G01V 7/04
[52] U.S. Cl. .................................. 73/382 G; 356/349
[58] Field of Search ............ 73/382 R, 382 G, 517 R, 73/516 R; 356/345, 349, 350

[56] References Cited

U.S. PATENT DOCUMENTS

| 3,250,133 | 5/1966 | Savet | 73/382 G |
| 3,786,681 | 1/1974 | Kiehn | 73/382 R |

Primary Examiner—James J. Gill
Attorney, Agent, or Firm—Fred E. Hook

[57] ABSTRACT

Gravity gradiometer including a ring laser cavity, two modulator elements in the path of the laser beam, and spaced masses attached to the modulator elements to provide a differential modulation of circular polarization modes proportional to the difference in gravity at the location of the two masses. In one form, a biasing element is added to shift the operating point of the laser system to improve performance.

33 Claims, 2 Drawing Figures

RING LASER GRAVITY GRADIOMETER

BACKGROUND OF THE INVENTION

This application is a continuation of a U.S. patent application with the same title, Ser. No. 039,410, filed on May 15, 1979, now abandoned, which itself is a continuation of a parent U.S. Patent application with the same title, Ser. No. 910,972, filed on May 30, 1978, now abandoned.

This invention relates to gravity gradiometers and more particularly to a gravity gradiometer using a laser force-measurement principle.

The prior art believed to be most relevant to the present invention is U.S. Pat. 3,786,681, issued to Kiehn, on Jan. 22, 1974, and entitled "Electromagnetic Wave Modulation and Measurement System and Method." As taught by that patent, a small force may be measured by use of a ring laser in which a photoelastic modulation element is torqued by the force. In the ring laser, multiple circular polarization modes of the laser beam are differentially modulated in frequency by the application of the torque to the modulator element. A portion of the modulated beam is passed from the cavity to a beat detector which provides an output indicating the frequency difference caused by the modulator element. As noted in that patent, the response of the system is linear once the beat frequency has become high enough to avoid phase-locking effects.

As noted in the patent, a gravimeter may be produced by simply supporting a test mass from the lever arm attached to the modulator element. It is also noted that this arrangement also provides an accelerometer since any acceleration of the device applies a force due to acceleration of the test mass. In applications such as borehole gravity measurement, it is desirable to make gravity measurements which are unaffected by acceleration of the instrument itself. Such a device would allow the measurement to be taken while the device is in motion in the borehole which would in turn result in much less time being required to make a survey of the borehole. In most borehole work, the primary quantity to be measured is the difference in gravity over a short known interval and the absolute gravity reading does not actually need to be known.

SUMMARY OF THE INVENTION

Accordingly, an object of the present invention is to provide an improved gravity gradiometer.

A gravity gradiometer according to the present invention comprises: a laser cavity in which a laser beam having a plurality of circular polarization modes is generated; a pair of modulators in the path of the laser beam in the laser cavity for differentially modulating the frequency of the various polarization modes of the laser beam; and spaced apart masses connected to the modulator elements in such a way that the force of gravity generates a torque in the modulator elements proportional to the force so that the net modulation of the circular polarization modes corresponds to the difference in gravity at the location of the two masses. In a preferred form, a biasing element is included within the ring laser cavity to shift the operation point of the gradiometer into a better operating range.

BRIEF DESCRIPTION OF THE DRAWINGS

The present invention may be more fully understood by reading the following detailed description with reference to the accompanying drawings wherein.

DESCRIPTION OF THE PREFERRED EMBODIMENT

Figure 1:
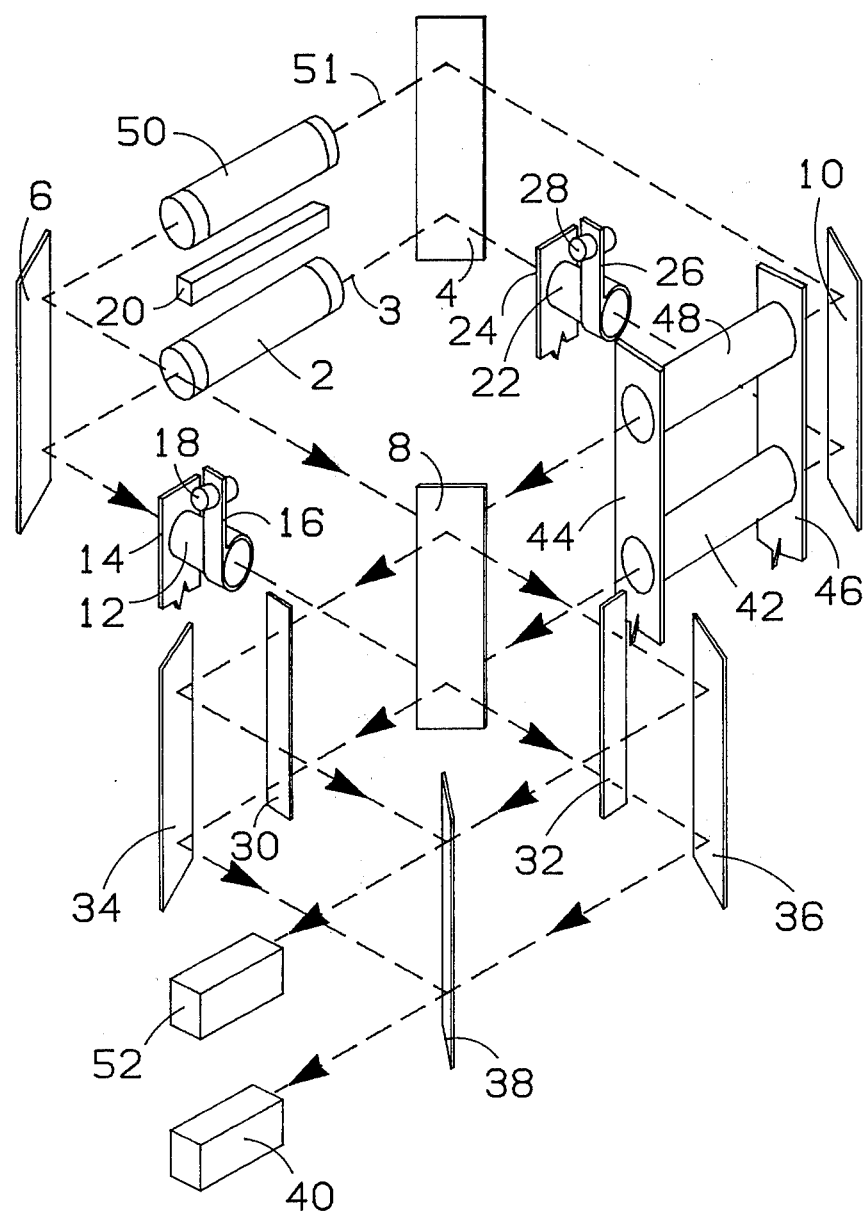
FIG. 1 is a diagrammatic illustration of a ring laser gravity gradiometer according to the present invention.

FIG. 1 illustrates the basic elements of a gravity gradiometer according to the present invention in essentially the same manner as the gravity meter taught by the above-referenced U.S. Pat. No. 3,786,681 as illustrated. In FIG. 1, a basic ring laser comprises a laser amplifier tube 2 and mirrors 4, 6, 8, and 10. Mirror 8 is partially transmissive to allow a portion of the laser beam 3 to be transmitted to beat-detecting apparatus more fully described below. A modulator element 12 comprising a quartz rod is positioned within the ring laser beam and is mounted at one end to a rigid support element 14. A lever 16 is bonded to the opposite end of modulator 12 and a mass 18 is bonded to the end of the lever 16.

In similar fashion, a second modulator element 22 is also positioned in the path of the laser beam and is bonded to a second support member 24. A second lever 26 and mass 28 are attached to the opposite end of modulator element 22.

Circular polarization of the laser beam 3 generated by amplifier tube 2 may be insured by the use of a bar magnet illustrated at 20 or by other suitable means. The circular polarization modes of the laser beam are differentially modulated by torques applied to the modulator elements 12 and 22. As illustrated in FIG. 1, a gravitational force in the plane of the drawing will apply a torque to both modulator elements 12 and 22. If the force is equal at the positions of masses 18 and 28, the torques on the modulators will be equal and there will be a net zero effect on the frequencies of the various polarization modes. If a gravity gradient exists, there will be a difference in the force applied to the modulator elements and a net frequency difference will occur between the circular polarization modes.

A portion of the beam 3 generated by amplifier tube 2 passes through the partially transmissive mirror 8 to a beat detection portion of the system. This portion of the system includes polarizers 30 and 32, mirrors 34 and 36, and a beam splitter 38 for recombining beams. The recombined beam from beam splitter 38 is directed to a beat detector 40 which provides electrical output indicating the beat frequency. The operation of this beat detection portion of the system is well known and need not be described in further detail.

As noted in the above-referenced U.S. Pat. No. 3,786,681, the basic force-measurement system exhibits a phase-locking characteristic near the zero beat frequency corresponding to zero force. In the present gravity gradiometer, it can be seen that the basic system as thus far described will operate near a zero beat frequency because the gravity gradient over relatively short intervals is very small. In addition, the indicated gradient may be either positive or negative, depending on the orientation of the sensing device. Where the device operates in such a condition, it is important to know the sense of the gradient and not simply the magnitude which the beat frequency would indicate. Therefore, in the preferred embodiment, a bias element 42 is included within the basic ring laser cavity of the gravity gradiometer. This biasing element 42 is preferably another quartz rod similar to that used to consruct modulators 12 and 22 which is pretorqued and bonded to rigid supports 44 and 46 to maintain a permanent torque on the biasing element 42. In this way, the element 42 generates a steady-state frequency shift between the circular polarization modes of the beam 3 generated by the laser amplifier tube 2. This permanent shift in the frequencies moves the output of beat detector 40 away from the zero point to a more linear operating range and allows a direct determination of the sense of a gravity gradient detected by the device. A gravity gradient detected by the modulator elements 12 and 22 will either increase the beat frequency output from detector 40 above or below the bias level generated by element 42, and this will indicate positive or negative characteristics of the gradient.

Since any variations in the bias level generated by element 42 would appear as signals in the output, it is very important that the torque on element 42 be maintained constant over all operating conditions, or, in the alternative, that it be monitored so that changes in the bias level will be known to allow corrections to the signal to be made. In a further preferred embodiment, the torque applied to element 42 is also applied to a stressing element 48 permanently bonded to the same two support members 44 and 46. In this arrangement, only one of the two support members 44 and 46 is bonded to the housing of the device and the other support is allowed to float free to insure that the torque in the elements 42 and 48 are equal in magnitude though opposite in sense. Element 48 is preferably another quartz rod of dimensions identical to those of element 42. By this arrangement, any changes caused in element 42 by environmental changes such as temperature or shock should be experienced equally by element 48, resulting in a net zero effect on the bias level of element 42.

While amorphous quartz is the preferred material from which elements 12, 22, 42, and 48 are made, it is clear that other materials may be substituted. As noted in U.S. Pat. No. 3,786,681, other photoelastic materials which exhibit force-responsive birefringent effects may also be used.

In a yet further preferred embodiment, the actual torque applied to element 42 is monitored by setting up a second ring laser passing through stressing element 48 having a beat frequency output indicating only the torque applied to element 48. The second ring laser employs a second laser amplifier tube 50 essentially identical to that employed as element 2. The magnetic field arrangement used to insure circular polarization in tube 2 may also be used for the same purpose for tube 50. The cavity comprises the same mirrors 4, 6, 8, and 10 used to form the first ring laser cavity. The second ring laser beam 51 travels essentially the same length path as the beam 3 and reflects from the corner mirrors at different portions of the mirror surface. Likewise, the beat frequency detection portion of the system comprises the same elements 30, 32, 34, 36, and 38 used to detect the beat frequency of the first system. A second beat detector 52 is used to detect the beat frequency of the second ring laser.

As shown in FIG. 1, many of the parts used to form the first ring laser cavity can be used to form the second, thereby reducing the complexity of the overall system. It would also be possible to pass the beam 51 through biasing element 42 itself wihout interfering with beam 3. This can be done either by physical separation of the paths of beams 3 and 51 through element 42 or by use of different frequencies for beams 3 and 51 with separation accomplished by filters. The arrangement illustrated in the drawing is believed to be more practical and is therefore preferred.

The output of beat detector 52 may be monitored on a second recording channel or second stripchart trace along with the output of beat detector 40 as a verification of constant bias level in the basic gradiometer system. Alternatively, the output of beat detector 52 may be subtracted from the output of detector 40 before that output is recorded as an indication of gravity gradient. In this way, a single corrected output indicating amplitude and correct direction of gradient may be provided. Alternatively, the extra laser tube 50 and beat detector 52 may be employed only during the calibration process of gradiometers as illustrated. This would allow a reduction in cost and simplification in the operation of field systems.

Figure 2:
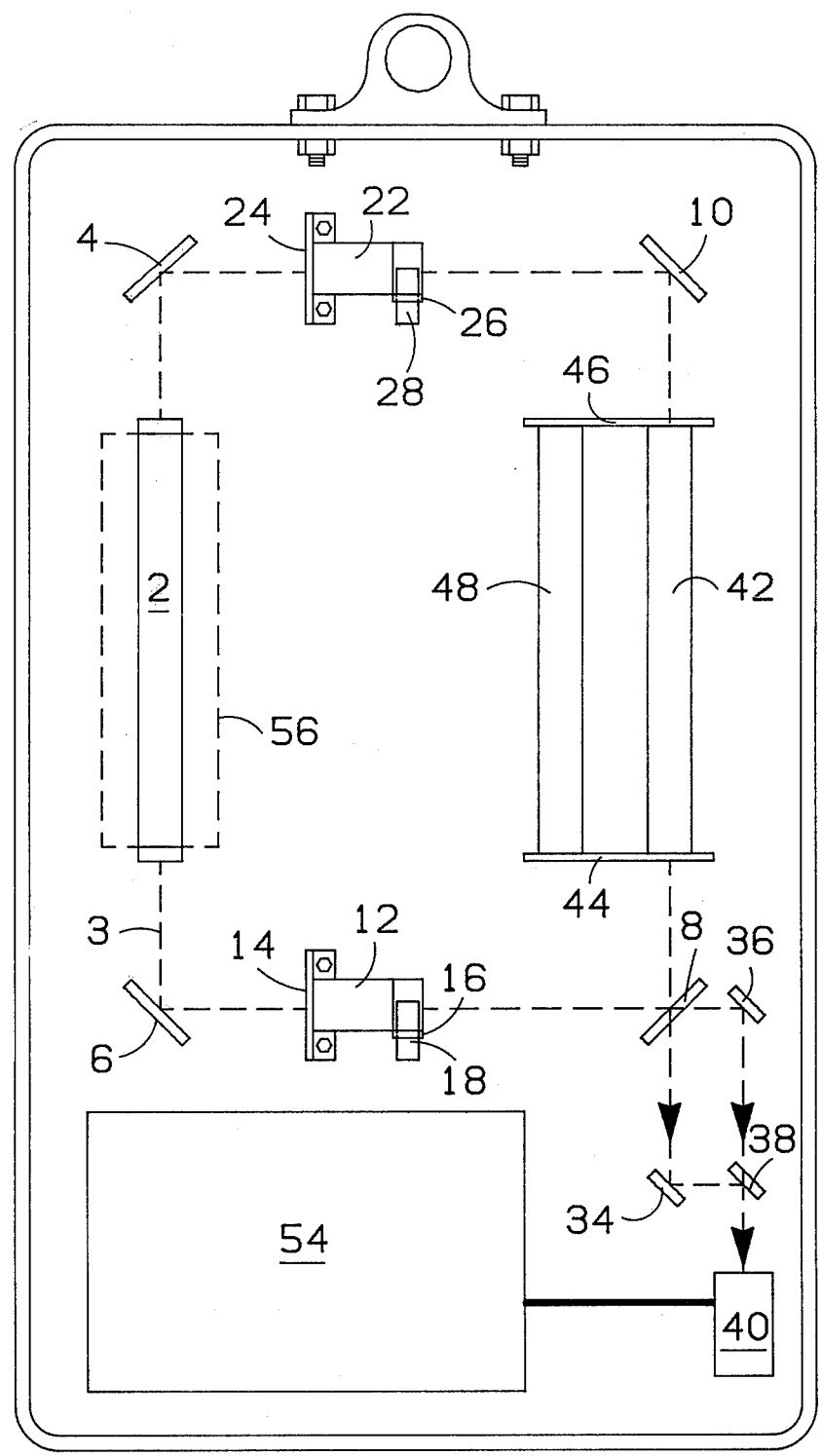
FIG. 2 is an illustration of the relative positioning of the elements of FIG. 1 in a borehole logging sonde.

With reference now to FIG. 2, there is illustrated a suggested layout of a ring laser gravity gradiometer, according to the present invention, in a logging sonde. The elements corresponding to those shown in FIG. 1 are labeled with the same designator numbers. The basic gradiometer ring is made up of the amplifier tube 2 and mirrors 4, 6, 8, and 10. For measuring vertical gravity gradient, modulator elements 12 and 22 are spaced vertically apart as shown and are mounted to the casing by brackets 14 and 24 in a rigid manner. Levers 16 and 26 are mounted to the opposite ends of the modulator elements, respectively, and extend normal to the surface of the drawing. Masses 18 and 28 are supported on the lever arms, respectively. As illustrated, the bias element 42 is also placed in the ring laser cavity. Stressing element 48 is positioned to the inside of the ring outside the path of the beam and, as illustrated, does not have its own permanent monitoring system, as illustrated in FIG. 1. As noted above, the stressing element could be monitored during the calibration cycle and the monitor elements removed for field use.

While the length of lever arms 16 and 26 is limited by borehole diameter, the vertical spacing is not. It is expected that for practical borehole work a vertical spacing of from 3 to 10 feet will be chosen. When the vertical spacing is increased, the laser beam typically is transmitted through a non-modulating medium such as air or vacuum in the gap between, for example, tube 2 and mirror 4. Such a non-modulating medium causes no differential frequency changes and therefore does not affect the output of beat detector 40.

As illustrated in FIG. 2, a portion of the laser beam 3 passes through mirror 8 and is directed by mirrors 34 and 36 to beam splitter 38, and thence to beat detector 40. The output of beat detector 40 is coupled to an electronics package 54 where it would be typically sampled, digitized, and transmitted to surface electronics for permanent recording. An alternate method of sending the information up the borehole is to simply amplify and transmit the beat frequency itself. This type of FM transmission is known to be resistant to noise and would simplify the circuitry 54 by not requiring a counter for converting the beat frequency to a digital count. Package 54 would also contain power supply and control circuitry for exciting the laser tube 2 by means of a starter 56 indicated by the dashed line around tube 2.

The apparatus shown in FIG. 2 would be connected to surface electronics by standard armored logging cable which would both support the instrument in the borehole and provide signal and power connections. The device would typically be lowered to the bottom of a borehole and then activated and lifted through borehole at a constant rate while readings of gravity gradient were recorded. These readings would be used in a well known manner to determine the density variations of the earth formations through which the borehole traveled. Since the modulators 12 and 22 are rigidly mounted to the same structure, they will experience the same accelerations due to linear movement of the device through the borehole and thus these accelerations should cancel out from the output of beat detector 40. As a result, only the actual earth gravity gradient experienced by the device should affect the final output of beat detector 40. Since the readings can be taken while the device is in motion, the gravity log can be made in a much shorter time than is possible with a simple gravimeter which must be stationary for a period of time before a reading can be taken.

To insure absolute rigidity of the overall sensing structure and to minimize gas-solid interfaces through which the laser beam must pass, it is believed that the laser gravity gradiometer should be constructed within essentially a solid block of quartz. Such a construction technique is illustrated in FIGS. 3a and 3b of U.S. Pat. No. 3,517,560, issued to Jacobs, et al., on June 30, 1970.

While the present invention has been shown and illustrated in terms of specific apparatus, it is apparent that other modifications and changes can be made within the scope of the present invention as defined by the appended claims.

What is claimed is:

1. A gravity gradiometer comprising:
   a laser for generating a laser beam having a plurality of circular polarization modes;
   first and second modulators each comprising a photoelastic element positioned in the path of said laser beam for differentially altering the characteristics of said polarization modes in response to the application of a stress, each of said modulators fixedly supported at a first end,
   first and second masses connected to second ends of said first and second modulators, respectively, with the center of each mass displaced from the axis of the laser beam passing through each modulator so that the force of gravity upon the respective masses generates a differential torque about the axis of the laser beam to produce a frequency difference between said circular modes of polarization which is related to the difference in the force of gravity at the locations of said first and second masses; and
   means for detecting said frequency difference.

2. A gravity gradiometer according to claim 1 in which said laser includes a laser tube and at least three reflectors forming a ring laser cavity for said tube.

3. A gravity gradiometer according to claim 1 in which said laser includes a gas laser tube.

4. A gravity gradiometer according to claim 1 including a biasing element positioned within the path of the laser beam, said biasing element consisting of photoelastic material pre-stressed by application of a permanent torque wherein the axis of the torque is parallel to the axis of the laser beam, whereby said biasing element causes an essentially constant frequency difference between the polarization modes in addition to that caused by said first and second modulators and causes said gradiometer to operate in a linear response range.

5. A gravity gradiometer according to claim 4 wherein said biasing element is pre-stressed by being permanently bonded to a stressing element consisting of photoelastic material and further including a second laser for generating a second laser beam having a plurality of circular polarization modes positioned so that said second laser beam passes through said stressing element along the axis of the torque applied to said stressing element, so that said stress produces a frequency difference between said modes, and also further including second means for detecting the frequency difference between the modes of said second beam.

6. An improved force-responsive measurement device according to claim 4 wherein said biasing element is pre-stressed by being bonded to a stressing element consisting of the same photoelastic material as said biasing element and having essentially the same dimensions as said biasing element, whereby the level of stress in said biasing element is constant over a range of environmental conditions.

7. A method for determining gravity gradients comprising the steps of:
   generating a laser beam having a plurality of circular polarization modes;
   positioning a first and second modulator in the path of said laser beam for differentially altering the characteristics of said polarization modes in response to the application of a stress, each of said modulators comprising a photoelastic element, and each being fixedly supported at a first end;
   attaching first and second masses to said first and second modulators, respectively, with the center of each mass displaced from the axis of the laser beam passing through each modulator so that the force of gravity upon the respective masses generates a differential torque about the axis of the laser beam to produce a frequency difference between said circular modes of polarization which is related to the difference in the force of gravity at the locations of said first and second masses; and
   detecting said frequency difference.

8. The method of claim 7, including the step 5 of employing at least three reflectors and a laser tube to form a ring laser cavity to generate said laser beam.

9. The method of claim 7 wherein said laser tube comprises a gas laser tube.

10. The method of claim 7, including the step of positioning a biasing element wihin the path of said laser beam, said biasing element comprising photoelastic material pre-stressed by application of a permanent torque wherein the axis of the torque is parallel to the axis of the laser beam, whereby said biasing element causes an essentially constant frequency difference between said polarization modes in addition to that caused by said first and second modulators, thus causing said method to provide a linear response to said gravity gradients.

11. The methods of claims 7 or 8 or 9 or 10, wherein said methods are employed for determining gravity gradients in a borehole.

12. A gravity gradiometer comprising:

a laser for generating a laser beam having a plurality of circular polarization modes;

first and second modulators each comprising means positioned in the path of said laser beam for differentially altering the characteristics of said polarization modes in response to the application of a stress, each of said modulators being fixedly supported at a first location on each of said modulators;

first and second masses connected to second locations of said first and second modulators, respectively, with the center of each mass displaced from the axis of the laser beam passing through each modulator so that the force of gravity upon the respective masses generates a differential effect on the laser beam to produce a frequency difference between said circular modes of polarization which is related to the difference in the force of gravity at the locations of said first and second masses; and means for detecting said frequency difference.

13. A gravity gradiometer according to claim 12 in which said laser includes a laser tube and at least three reflectors forming a ring laser cavity for said tube.

14. A gravity gradiometer according to claim 12 in which said laser includes a gas laser tube.

15. A gravity gradiometer according to claim 12 including a biasing element positioned within the path of the laser beam, said biasing element consisting of photoelastic material pre-stressed by application of a permanent torque wherein the axis of the torque is parallel to the axis of the laser beam, whereby said biasing element causes an essentially constant frequency difference between the polarization modes in addition to that caused by said first and second modulators and causes said gradiometer to operate in a linear response range.

16. A gravity gradiometer according to claim 15 wherein said biasing element is pre-stressed by being permanently bonded to a stressing element consisting of photoelastic material and further including a second laser for generating a second laser beam having a plurality of circular polarization modes positioned so that said second laser beam passes through said stressing element along the axis of the torque applied to said stressing element, so that said stress produces a frequency difference between said modes, and also further including second means for detecting the frequency difference between the modes of said second beam.

17. A gravity gradiometer according to claim 15 wherein said biasing element is pre-stressed by being bonded to a stressing element consisting of the same photoelastic material as said biasing element and having essentially the same dimensions as said biasing element, whereby the level of stress in said biasing element is constant over a range of environmental conditions.

18. A method for determining gravity gradients comprising steps of:

generating a laser beam having a plurality of circular polarization modes;

positioning first and second modulator means in the path of said laser beam for differentially altering the characteristics of said polarization modes in response to the application of a stress, each of said modulators being fixedly supported at a first location on each of said modulator means;

attaching first and second masses to second locations on said first and second modulator means, respectively, with the center of each mass displaced from the axis of said laser beam passing through each modulator so that the force of gravity upon the respective masses generates a differential effect on the laser beam to produce a frequency difference between said circular modes of polarization which is related to the difference in the force of gravity at the locations of said first and second masses; and detecting said frequency difference.

19. The method of claim 18, including the step of employing at least three reflectors and a laser tube to form a ring laser cavity to generate said laser beam.

20. The method of claim 18 wherein said laser tube comprises a gas laser tube.

21. The method of claim 18, including the step of positioning a biasing element within the path of said laser beam, said biasing element comprising photoelastic material pre-stressed by application of a permanent torque wherein the axis of the torque is parallel to the axis of the laser beam, whereby said biasing element causes an essentially constant frequency difference between said polarization modes in addition to that caused by said first and second modulators, thus causing said method to provide a linear response to said gravity gradients.

22. The methods of claims 18 or 19 or 20 or 21, wherein said methods are employed for determining gravity gradients in a borehole.

23. A gravity gradiometer comprising:

a laser for generating a laser beam having a plurality of circular polarization modes;

first and second modulators each comprising means positioned in the path of said laser beam for differentially altering the characteristics of said polarization modes in response to the application of a stress, each of said modulators being fixedly supported at a first location on each of said modulators;

first and second masses connected to second locations of said first and second modulators, respectively, with the center of each mass displaced from the axis of the laser beam passing through each modulator so that the force of gravity upon the respective masses generates a shift in the frequency of operation of the laser beam which is related to the difference in the force of gravity at the locations of said first and second masses; and means for detecting said frequency shift.

24. A gravity gradiometer according to claim 23 in which said laser includes a laser tube and at least three reflectors forming a ring laser cavity for said tube.

25. A gravity gradiometer according to claim 23 in which said laser includes a gas laser tube.

26. A gravity gradiometer according to claim 23 including a biasing element positioned within the path of the laser beam, said biasing element consisting of photoelastic material pre-stressed by application of a permanent torque wherein the axis of the torque is parallel to the axis of the laser beam, whereby said biasing element causes an essentially constant frequency difference between the polarization modes in addition to that caused by said first and second modulators and causes said gradiometer to operate in a linear response range.

27. A gravity gradiometer according to claim 26 wherein said biasing element is pre-stressed by being permanently bonded to a stressing element consisting of photoelastic material and further including a second laser for generating a second laser beam having a plurality of circular polarization modes positioned so that said second laser beam passes through said stressing element along the axis of the torque applied to said stressing element, so that said stress produces a frequency difference between said modes, and also further including second means for detecting the frequency difference between the modes of said second beam.

28. A gravity gradiometer according to claim 26 wherein said biasing element is pre-stressed by being bonded to a stressing element consisting of the same photoelastic material as said biasing element and having essentially the same dimensions as said biasing element, whereby the level of stress in said biasing element is constant over a range of environmental conditions.

29. A method for determining gravity gradients comprising the steps of:
generating a laser beam having a plurality of circular polarization modes;
positioning first and second modulator means in the path of said laser beam for differentially altering the characteristics of said polarization modes in response to the application of a stress, each of said modulator means being fixedly supported at a first location on each of said modulator means;
attaching first and second masses to second locations on said first and second modulator means, respectively, with the center of each mass displaced from the axis of the laser beam passing through each modulator so that the force of gravity upon the respective masses generates a shift in the frequency of operation of the laser beam which is related to the difference in the force of gravity at the locations of said first and second masses; and
detecting said frequency shift.

30. The method of claim 29, including the step of employing at least three reflectors and a laser tube to form a ring laser cavity to generate said laser beam.

31. The method of claim 29 wherein said laser tube comprises a gas laser tube.

32. The method of claim 29, including the step of positioning a biasing element within the path of said laser beam, said biasing element comprising photoelastic material pre-stressed by application of a permanent torque wherein the axis of the torque is parallel to the axis of the laser beam, whereby said biasing element causes an essentially constant frequency difference between said polarization modes in addition to that caused by said first and second modulators, thus causing said method to provide a linear response to said gravity gradients.

33. The methods of claims 29 or 30 or 31 or 32, wherein said methods are employed for determining gravity gradients in a borehole.

* * * * *